(12) United States Patent
Bentley

(10) Patent No.: US 10,316,854 B2
(45) Date of Patent: Jun. 11, 2019

(54) SHAFT AND A TURBOMACHINE

(71) Applicant: ROLLS-ROYCE PLC, London (GB)

(72) Inventor: Martin T Bentley, Derby (GB)

(73) Assignee: ROLLS-ROYCE plc, London (GB)

( * ) Notice: Subject to any disclaimer, the term of this patent is extended or adjusted under 35 U.S.C. 154(b) by 336 days.

(21) Appl. No.: 15/446,506

(22) Filed: Mar. 1, 2017

(65) Prior Publication Data

US 2017/0284411 A1    Oct. 5, 2017

(30) Foreign Application Priority Data

Mar. 31, 2016 (GB) .................................. 1605407.4

(51) Int. Cl.
*F01D 5/06*  (2006.01)
*F01D 5/08*  (2006.01)
(Continued)

(52) U.S. Cl.
CPC ............. *F04D 29/053* (2013.01); *F01D 5/06* (2013.01); *F01D 5/085* (2013.01); *F01D 11/001* (2013.01);
(Continued)

(58) Field of Classification Search
CPC ... F01D 25/12; F01D 5/06; F01D 5/08; F01D 5/082; F01D 5/085; F01D 11/001;
(Continued)

(56) References Cited

U.S. PATENT DOCUMENTS 2,584,899 A * 2/1952 McLeod ................. F01D 9/041
                                                    384/313
2,636,665 A * 4/1953 Lombard .................. F01D 5/08
                                                    415/115
(Continued)

FOREIGN PATENT DOCUMENTS

GB        635783 A       4/1950
GB        826568 A       1/1960

OTHER PUBLICATIONS

Oct. 17, 2017 extended Search Report issued in European Patent Application No. 17158634.0.
(Continued)

*Primary Examiner* — Richard A Edgar
*Assistant Examiner* — Elton K Wong
(74) *Attorney, Agent, or Firm* — Oliff PLC

(57) ABSTRACT

A shaft has an axis, an outer surface, an inner surface and is arranged to rotate in a first circumferential direction. The shaft comprises a first set of equally circumferentially spaced apertures extending through the shaft between the outer and inner surfaces of the shaft. A second set of equally circumferentially spaced apertures extends through the shaft between the outer and inner surfaces of the shaft. The first and second sets of apertures are arranged in first and second planes arranged perpendicularly to the axis of the shaft. The second plane is spaced axially downstream from the first plane. Each aperture in the second set of apertures is circumferentially displaced in a second circumferential direction from a circumferential mid position between the
(Continued)

two apertures in the first set of apertures to reduce the stresses in the shaft.

21 Claims, 6 Drawing Sheets

(51) Int. Cl.
- *F16C 3/02* (2006.01)
- *F01D 11/00* (2006.01)
- *F04D 29/32* (2006.01)
- *F04D 29/053* (2006.01)

(52) U.S. Cl.
CPC .............. *F04D 29/321* (2013.01); *F16C 3/02* (2013.01); *F16C 2360/23* (2013.01)

(58) Field of Classification Search
CPC .... F04D 29/053; F04D 29/321; F04D 29/582; F04D 29/584; F04D 29/5846; F05D 2240/60; F05D 2240/61; Y10T 464/10; F16C 3/02
USPC ......................................................... 415/180
See application file for complete search history.

(56) References Cited

U.S. PATENT DOCUMENTS

| | | | | |
|---|---|---|---|---|
| 4,941,317 | A | * | 7/1990 | Ivey .................. F01D 5/085 416/95 |
| 5,857,835 | A | * | 1/1999 | Rolt .................. F01D 5/08 415/177 |
| 6,094,905 | A | * | 8/2000 | Fukuyama ............ F01D 5/06 415/115 |
| 7,309,211 | B2 | | 12/2007 | Ellis et al. |
| 2004/0037641 | A1 | | 2/2004 | Wagner |
| 2005/0051111 | A1 | * | 3/2005 | Thoma .................. F24V 40/00 122/26 |

OTHER PUBLICATIONS

Oct. 4, 2016 Search Report issued in Great Britain Patent Application No. GB165407.4.

\* cited by examiner

SHAFT AND A TURBOMACHINE

The present disclosure relates to a shaft and to a turbomachine shaft for example a gas turbine engine shaft.

A gas turbine engine comprises one or more turbines each of which is arranged to drive an associated compressor via a shaft. In some instances there is a requirement to provide apertures through the shaft from the outer surface of the shaft to the inner surface of the shaft in order to supply a fluid from the outer side of the shaft to the inner side of the shaft or visa-versa.

In order to provide the required flow area for the fluid it is known to provide two rows of apertures arranged in two planes arranged perpendicular to the axis of the shaft. However, in operation the shaft may be subjected to additional stresses due to the flow of the fluid, for example a coolant e.g. air, flowing through the apertures and the relatively high temperatures which may shorten the working life of the shaft. The fluid, coolant, may be arranged to cool turbine components and/or to pressurise chambers within the turbine of the gas turbine engine.

A solution to the problem may be to use a thicker shaft, but this would increase the weight of the shaft and the gas turbine engine and increase the cost of the shaft and the gas turbine engine. Another solution may be to make the shaft from a material, e.g. a metal, with better temperature and stress characteristics, but this would increase the cost of the shaft and the gas turbine engine.

Accordingly the present disclosure seeks to provide a shaft which reduces or overcomes the above mentioned problem.

According to a first aspect of the invention there is provided a shaft having an axis, an outer surface, an inner surface, an upstream end and a downstream end, the shaft being arranged to rotate in a first circumferential direction, the shaft comprising a first set of equally circumferentially spaced apertures extending through the shaft from the outer surface of the shaft to the inner surface of the shaft, the first set of apertures being arranged in a first plane arranged perpendicularly to the axis of the shaft, a second set of equally circumferentially spaced apertures extending through the shaft from the outer surface of the shaft to the inner surface of the shaft, the second set of apertures being arranged in a second plane arranged perpendicularly to the axis of the shaft, the second plane being spaced axially downstream from the first plane, each aperture in the second set of apertures being positioned circumferentially between two apertures in the first set of apertures and each aperture in the second set of apertures being circumferentially displaced in a second circumferential direction from a circumferential mid position between the two apertures in the first set of apertures.

Torque applied in an anti-clockwise direction when viewed from the downstream end of the shaft and the apertures in the second set of apertures are displaced circumferentially in a clockwise direction from the circumferential mid position between the two apertures in the first set of apertures.

There may be nine apertures in the first set of apertures and nine apertures in the second set of apertures, the apertures in the first set of apertures are circumferentially spaced apart by angles of 40° and the apertures in the second set of apertures are circumferentially spaced apart by angles of 40°.

Each aperture in the second set of apertures may be circumferentially spaced from a first one of the two apertures in the first set of apertures by 17° and is circumferentially spaced from a second one of the two apertures in the first set of apertures by 23°.

The first and second sets of apertures may be arranged in a portion of the shaft having a greater thickness than axially adjacent portions.

The apertures of the first set of apertures may all have the same diameter. The apertures of the second set of apertures may all have the same diameter. The apertures of the first set of apertures and the apertures of the second set of apertures may all have the same diameter.

The shaft may be a turbomachine shaft.
The shaft may be a steam turbine shaft.
The shaft may be a gas turbine engine shaft.
The shaft may connect a compressor to a turbine, a turbine to a turbine or a compressor to a compressor.

The shaft may have a third set of equally circumferentially spaced apertures extending through the shaft from the outer surface of the shaft to the inner surface of the shaft, the third set of apertures being arranged in a third plane arranged perpendicularly to the axis of the shaft, the third set of apertures being arranged in a third plane arranged perpendicularly to the axis of the shaft, the third plane being spaced axially downstream from the second plane, each aperture in the third set of apertures being positioned circumferentially between two apertures in the second set of apertures and each aperture in the third set of apertures being circumferentially displaced in a second circumferential direction from a circumferential mid position between the two apertures in the second set of apertures.

The shaft may have a fourth set of equally circumferentially spaced apertures extending through the shaft from the outer surface of the shaft to the inner surface of the shaft, the fourth set of apertures being arranged in a fourth plane arranged perpendicularly to the axis of the shaft, the fourth set of apertures being arranged in a fourth plane arranged perpendicularly to the axis of the shaft, the fourth plane being spaced axially downstream from the third plane, each aperture in the fourth set of apertures being positioned circumferentially between two apertures in the third set of apertures and each aperture in the fourth set of apertures being circumferentially displaced in a second circumferential direction from a circumferential mid position between the two apertures in the third set of apertures.

According to a second aspect of the present disclosure there is provided a turbomachine comprising a turbine and/or a compressor and a shaft, the shaft having an axis, an outer surface, an inner surface, an upstream end and a downstream end, the upstream end of the shaft being connected to the compressor and/or the downstream end of the shaft being connected to the turbine, the shaft being arranged to rotate in a first circumferential direction, the shaft comprising a first set of equally circumferentially spaced apertures extending through the shaft from the outer surface of the shaft to the inner surface of the shaft, the first set of apertures being arranged in a first plane arranged perpendicularly to the axis of the shaft, a second set of equally circumferentially spaced apertures extending through the shaft from the outer surface of the shaft to the inner surface of the shaft, the second set of apertures being arranged in a second plane arranged perpendicularly to the axis of the shaft, the second plane being spaced axially downstream from the first plane, each aperture in the second set of apertures being positioned circumferentially between two apertures in the first set of apertures and each aperture in the second set of apertures being circumferentially displaced in a second circumferential direction from a circumferential mid position between the two apertures in the first set of apertures.

The turbomachine may be a gas turbine engine comprising a turbine, a compressor and a shaft, the upstream end of the shaft being connected to the compressor and the downstream end of the shaft being connected to the turbine.

The gas turbine engine may comprise a low pressure compressor, an intermediate pressure compressor, a high pressure compressor, a high pressure turbine, an intermediate pressure turbine, a low pressure turbine, a high pressure shaft, an intermediate pressure shaft and a low pressure shaft, the high pressure turbine being connected to the high pressure compressor via the high pressure shaft, the intermediate pressure turbine being connected to the intermediate pressure compressor via the intermediate pressure shaft and the low pressure turbine being connected to the low pressure compressor via the low pressure shaft.

The gas turbine engine may comprise a low pressure compressor, an intermediate pressure compressor, a high pressure compressor, a high pressure turbine, a low pressure turbine, a high pressure shaft and a low pressure shaft, the high pressure turbine being connected to the high pressure compressor via the high pressure shaft and the low pressure turbine being arranged to drive the low pressure compressor and the intermediate pressure compressor via the low pressure shaft.

The gas turbine engine may comprise a low pressure compressor, an intermediate pressure compressor, a high pressure compressor, a high pressure turbine, a low pressure turbine, a high pressure shaft, a low pressure shaft and a gearbox, the high pressure turbine being connected to the high pressure compressor via the high pressure shaft, the low pressure turbine being arranged to drive the gearbox via the low pressure shaft, the gearbox being arranged to drive the low pressure compressor and the intermediate pressure compressor.

The low pressure compressor may be a fan or a propeller.

The gas turbine engine may comprise a low pressure compressor, a high pressure compressor, a high pressure turbine, a low pressure turbine, a high pressure shaft and a low pressure shaft, the high pressure turbine being connected to the high pressure compressor via the high pressure shaft and the low pressure turbine being connected to the low pressure compressor via the low pressure shaft.

The high pressure turbine may comprise a high pressure turbine disc having a bore extending coaxially therethrough, the shaft being an intermediate pressure shaft and the intermediate pressure shaft extending axially through the bore in the high pressure turbine disc, the first set of apertures being positioned axially between the axial ends of the bore of the high pressure turbine disc.

The high pressure turbine may comprise a high pressure turbine disc having a bore extending coaxially therethrough, the shaft being a low pressure shaft and the low pressure shaft extending axially through the bore in the high pressure turbine disc, the first set of apertures being positioned axially between the axial ends of the bore of the high pressure turbine disc.

The second set of apertures may be arranged axially downstream of the high pressure turbine disc.

The shaft may connect an intermediate pressure compressor and an intermediate pressure turbine.

The gas turbine engine may be an aero gas turbine engine, a marine gas turbine engine, an automotive gas turbine engine or an industrial gas turbine engine.

The aero gas turbine engine may be a turbofan gas turbine engine, a turbojet gas turbine engine, a turbo-shaft gas turbine engine or a turbo-propeller gas turbine engine.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
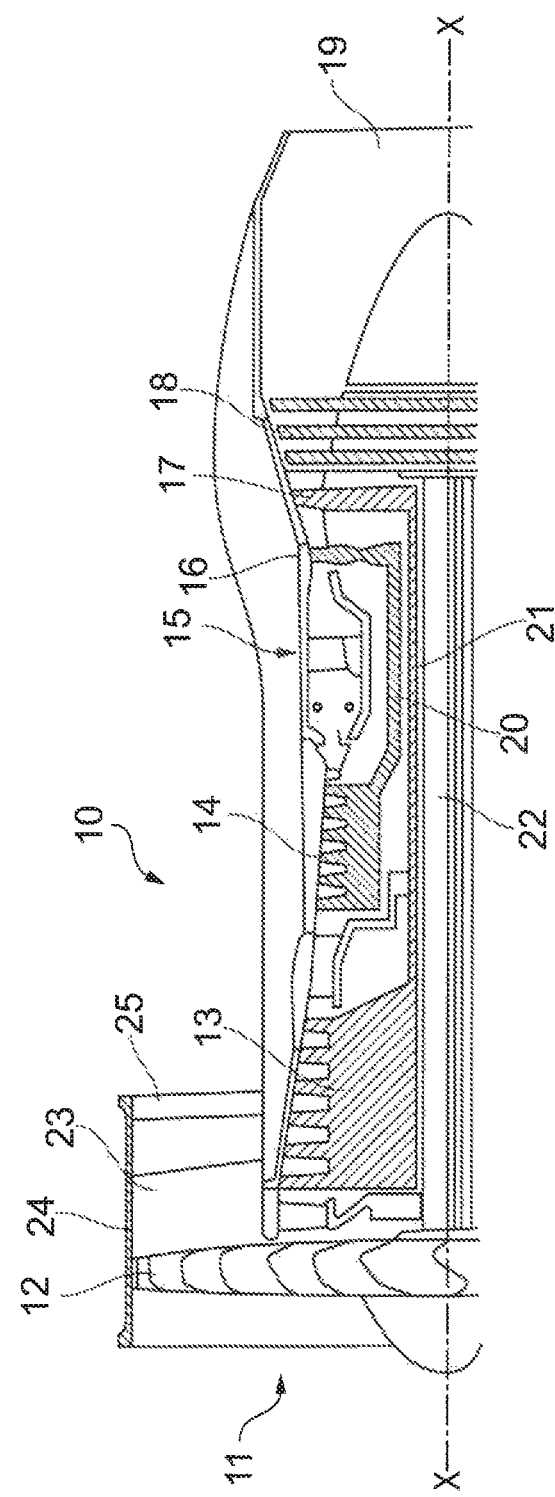
FIG. 1 is sectional side view of an upper half of a turbofan gas turbine engine having a shaft according to the present disclosure.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a high pressure shaft 20. The intermediate pressure turbine 17 is arranged to drive the intermediate pressure compressor 13 via an intermediate pressure shaft 21 and the low pressure turbine 18 is arranged to drive the fan 12 via a low pressure shaft 22. A fan casing 24 surrounds the fan 12 and a bypass duct 23 is defined by the fan casing 24 and the bypass duct 23 has a bypass, or fan, nozzle 25.

In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine and flows through the bypass duct 23 defined by the fan casing 24. The second portion of air leaving the bypass duct 23 flows through the bypass, or fan, nozzle 25 to provide propulsive thrust.

Figure 2:
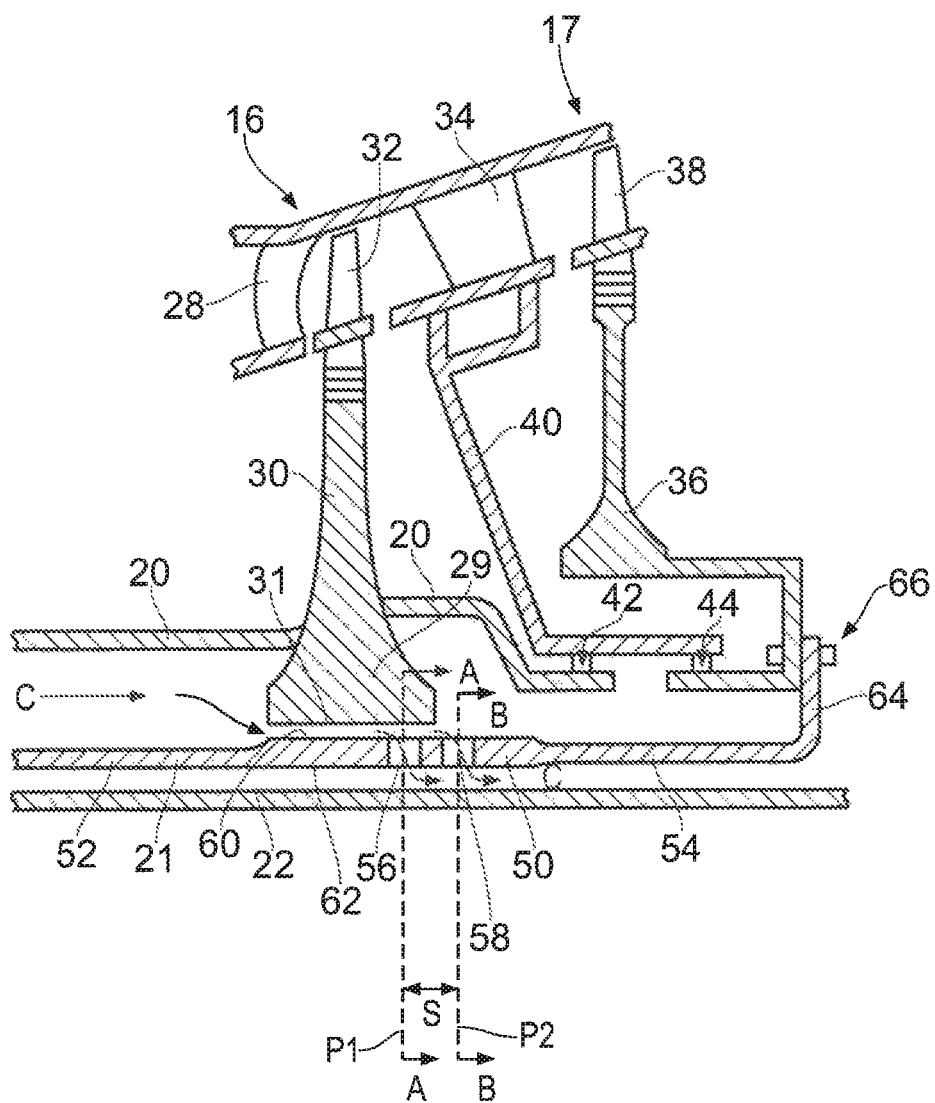
FIG. 2 is an enlarged cross-sectional view through the turbofan gas turbine engine of FIG. 1 showing the turbine and a shaft according to the present disclosure.

FIG. 2 shows the high pressure turbine 16 and the intermediate pressure turbine 17 in more detail. The high pressure turbine 16 comprises a plurality of high pressure turbine stator vanes 28 and a high pressure turbine disc 30 which has a plurality of circumferentially spaced turbine rotor blades 32 mounted thereon. The high pressure turbine disc 30 has a hub 29 and a coaxial bore 31 extends through the hub 29 of the high pressure turbine disc 30 and the high pressure turbine disc 30 is connected to the high pressure turbine shaft 20. The intermediate pressure turbine 17 comprises a plurality of intermediate pressure turbine stator vanes 34 and an intermediate pressure turbine disc 36 which has a plurality of circumferentially spaced turbine rotor blades 38 mounted thereon. The intermediate pressure turbine disc 36 is connected to the intermediate pressure turbine shaft 21. The intermediate pressure turbine stator vanes 34 are positioned axially between the high pressure turbine blades 32 and the intermediate pressure turbine blades 38. A support structure 40 extends radially inwardly from the intermediate pressure turbine stator vanes 34. The high pressure turbine disc 30 and the intermediate pressure turbine disc 36 are rotatably mounted on the support structure 40 via bearings 42 and 44 respectively. The intermediate pressure shaft 21 extends, e.g. coaxially, through the high pressure shaft 20 and through the bore 31 of the high pressure turbine disc 30 and the low pressure shaft 22 extends, e.g. coaxially, through the intermediate pressure shaft 21.

The intermediate pressure shaft 21 has a portion 50 which has a greater thickness than the axially adjacent portions 52 and 54. The axial length of the bore 31 is less than the axial length of the portion 50 of the intermediate pressure shaft 21. An upstream end of the portion 50 of the intermediate pressure shaft 21 is located axially within the bore 31 of the high pressure turbine disc 30 and the downstream end of the portion 50 of the intermediate pressure shaft 21 is positioned downstream of the high pressure turbine disc 30.

The intermediate pressure shaft 21 has an axis which is coaxial with the axis X-X of the turbofan gas turbine engine 10, an outer surface 60, an inner surface 62, an upstream end and a downstream end 64, the intermediate pressure shaft 21 is arranged to rotate in a first circumferential direction R, as shown in FIGS. 3 to 6. The upstream end of the intermediate pressure shaft 21 is connected to the intermediate pressure compressor 13 and the downstream end 64 of the intermediate pressure shaft 21 is connected to the intermediate pressure turbine 17, e.g. is connected to intermediate pressure turbine disc 36 via a bolted joint 66, as seen in FIG. 2.

The portion 50 of the intermediate pressure shaft 21 has a first set of apertures 56 and a second set of apertures 58, the first set of apertures 56 is positioned axially between the axial ends of the bore 31 of the high pressure turbine disc 30 and the second set of apertures 58 is positioned axially downstream of the high pressure turbine disc 30. However, it may be possible to position the first and second sets of apertures 56 and 58 axially between the axial ends of the bore 31 of the high pressure turbine disc 30 or to position the first and second sets of apertures 56 and 58 axially downstream of the high pressure turbine disc 30.

Figure 3:
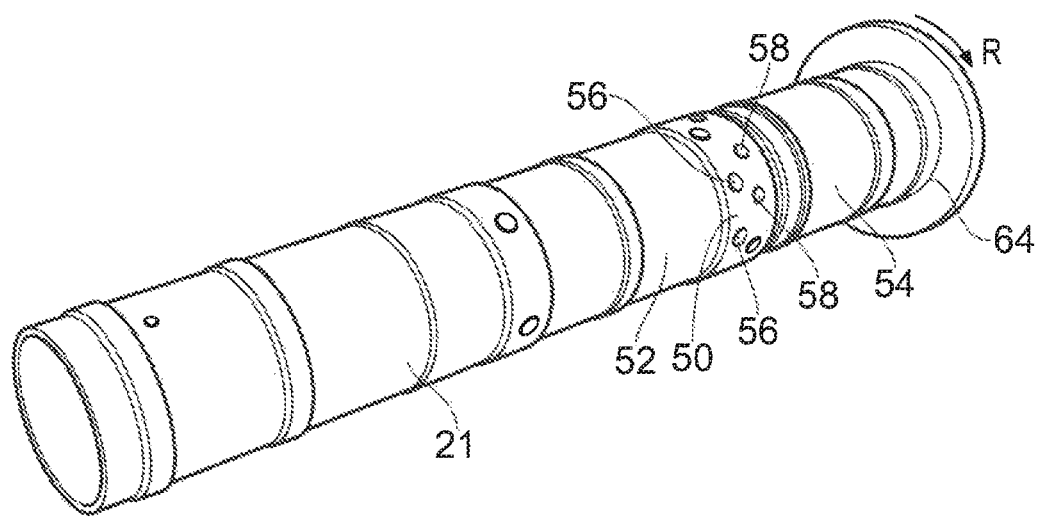
FIG. 3 is a further enlarged perspective view of the shaft according to the present disclosure.
Figure 4:
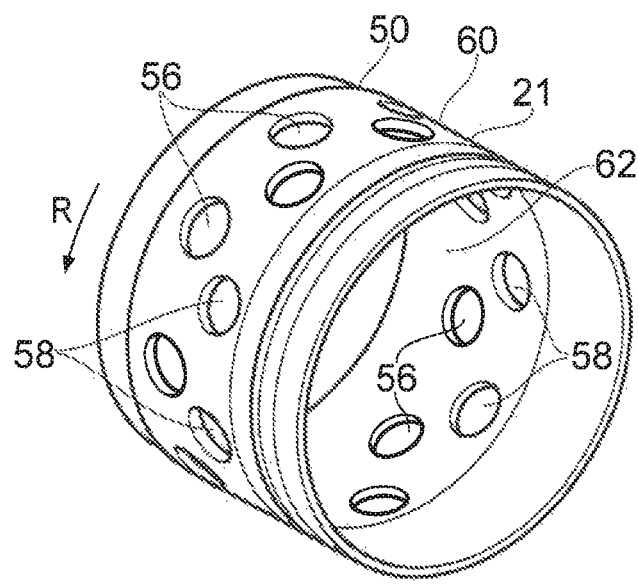
FIG. 4 is a further enlarged perspective view of a portion of the shaft shown in FIG. 3

The first set of apertures 56 are equally circumferentially spaced and extend through the intermediate pressure shaft 21 from the outer surface 60 of the intermediate pressure shaft 21 to the inner surface 62 of the intermediate pressure shaft 21. The first set of apertures 56 are arranged in a first plane P1 arranged perpendicularly to the axis X-X of the intermediate pressure shaft 21. The second set of apertures 58 are equally circumferentially spaced and extend through the intermediate pressure shaft 21 from the outer surface 60 of the intermediate pressure shaft 21 to the inner surface 62 of the intermediate pressure shaft 21. The second set of apertures 58 are arranged in a second plane P2 arranged perpendicularly to the axis X-X of the intermediate pressure shaft 21. The second plane P2 is spaced axially downstream from the first plane P1, as seen in FIGS. 2, 3 and 4. Each aperture in the second set of apertures 58 is positioned circumferentially between two apertures in the first set of apertures 56 and each aperture in the second set of apertures 58 is circumferentially displaced in a second circumferential direction from a circumferential mid position between the two apertures in the first set of apertures 56, as shown more clearly in FIGS. 5 and 6.

The first apertures 56 have a first radius r1 and the second apertures 58 have a second radius r2 and the first and second planes P1 and P2 are spaced apart by an axial distance S and S may be less than or equal to r1+r2 or S may be greater than or equal to r1+r2.

In operation of the turbofan gas turbine engine 10, coolant, cooling air, is bled from the intermediate pressure compressor 13 and the coolant C is supplied in a downstream direction in an annular chamber between the high pressure shaft 20 and the intermediate pressure shaft 21. The coolant C cools the high pressure turbine shaft 20 and then flows through the annular gap between the bore 31 of the high pressure turbine disc 30 and the portion 50 of the intermediate pressure shaft 21 to cool the high pressure turbine disc 30. The coolant C then flows through the first set of apertures 56 and the second set of apertures 58 into an annular chamber between the intermediate pressure shaft 21 and the low pressure shaft 22 to pressurise a cavity (not shown) defined between the intermediate pressure turbine 17 and the low pressure turbine 18. The radii of the apertures of the first and second sets of apertures 56 and 58 are selected to provide the required amount of coolant flow to maintain the bore 31 of the high pressure turbine disc 30 at an acceptable temperature.

The intermediate pressure turbine 17 applies torque to the intermediate pressure shaft 21 in an anti-clockwise direction when viewed from the downstream end of the intermediate pressure shaft 21 and hence the intermediate pressure shaft rotates in an anti-clockwise direction R and the apertures in the second set of apertures 58 are displaced circumferentially in a clockwise direction from the circumferential mid position between the two apertures in the first set of apertures 56 when viewed from the downstream end of the intermediate pressure shaft 21.

Figure 5:
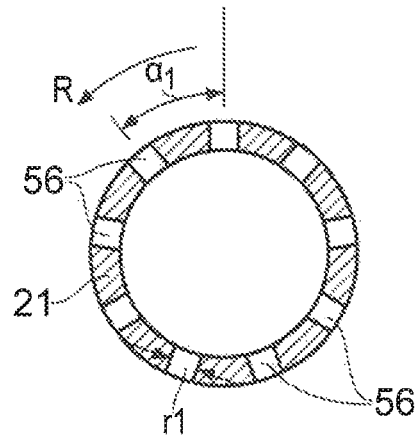
FIG. 5 is a cross-sectional view in the direction of arrows A-A in FIG. 2.
Figure 6:
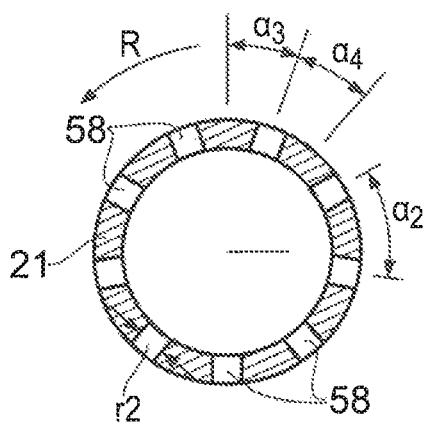
FIG. 6 is a cross-sectional view in the direction of arrows B-B in FIG. 2.

In this particular example there are nine apertures in the first set of apertures 56 and nine apertures in the second set of apertures 58, the apertures in the first set of apertures 56 are circumferentially spaced apart by angles α1 of 40° and the apertures in the second set of apertures 58 are circumferentially spaced apart by angles α2 of 40°. Each aperture in the second set of apertures 58 is circumferentially spaced from a first one of the two apertures in the first set of apertures by an angle α3 of 17° and is circumferentially spaced from a second one of the two apertures in the first set of apertures by an angle α4 of 23°, as shown in FIGS. 5 and 6. Thus, each aperture in the second set of apertures 58 is circumferentially displaced by an angle of 3° from the circumferential mid position between two apertures in the first set of apertures 56. The apertures of the first set of apertures 56 all have the same radius. The apertures of the second set of apertures 58 all have the same radius. The apertures of the first set of apertures 56 and the apertures of the second set of apertures 58 all have the same radius. However, it may be possible for the apertures of the first set of apertures 56 to have different radii to the apertures of the second set of apertures 58. Additionally, it may be possible to have any suitable number of first apertures and a corresponding number of second apertures, e.g. six, eight, ten, twelve etc.

Figure 7:
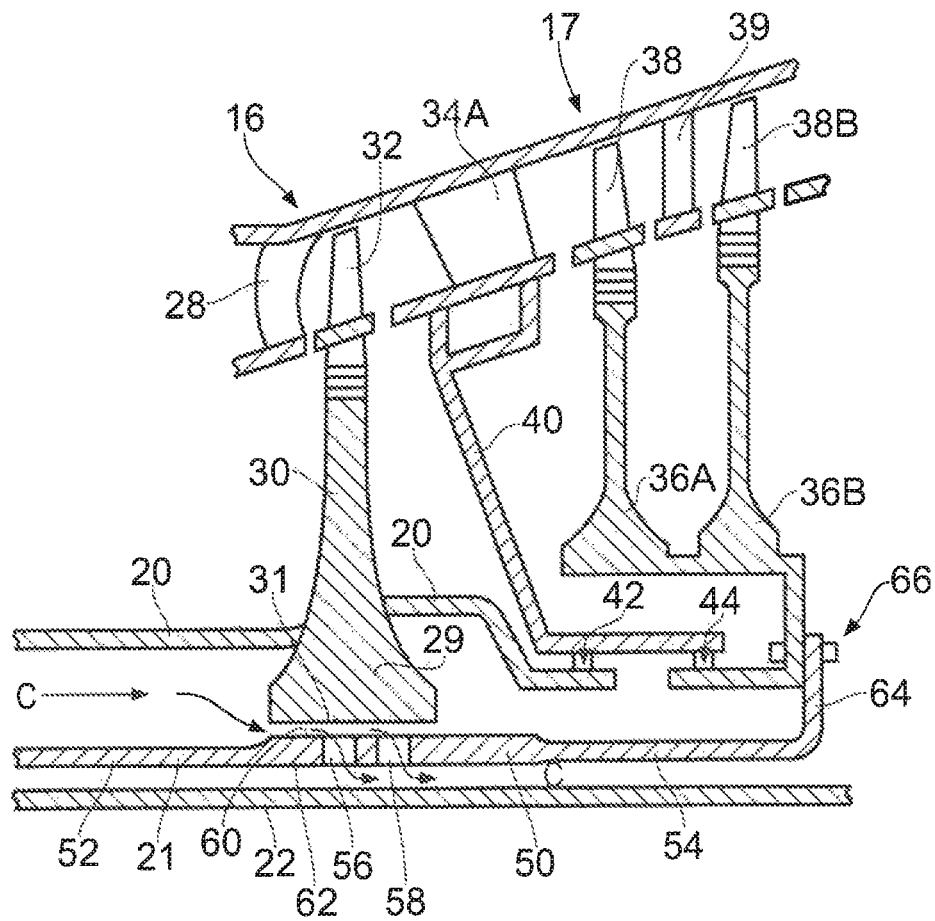
FIG. 7 is an enlarged alternative cross-sectional view through the turbofan gas turbine engine of FIG. 1 showing the turbine and a shaft according to the present disclosure.

FIG. 7 shows an alternative arrangement of the high pressure turbine 16 and the intermediate pressure turbine 17 in more detail. The arrangement is similar to that shown in FIG. 2, but the intermediate pressure compressor 17 comprises a first intermediate pressure turbine disc 36A which has a plurality of circumferentially spaced turbine rotor blades 38A mounted thereon and a second intermediate pressure turbine disc 36B which has a plurality of circumferentially spaced turbine rotor blades 38B mounted thereon. The second intermediate pressure turbine disc 36B is positioned downstream of and is secured to the first intermediate pressure turbine disc 36A. The second intermediate pressure turbine disc 36B is connected to the intermediate pressure turbine shaft 21. A support structure 40 extends radially inwardly from a first set of intermediate pressure turbine stator vanes 34A and a second set of intermediate pressure turbine stator vanes 34B are positioned axially between the turbine rotor blades 36A and 36B. In this arrangement the first and second sets of apertures 56 and 58 are positioned axially between the axial ends of the bore 31.

Figure 8:
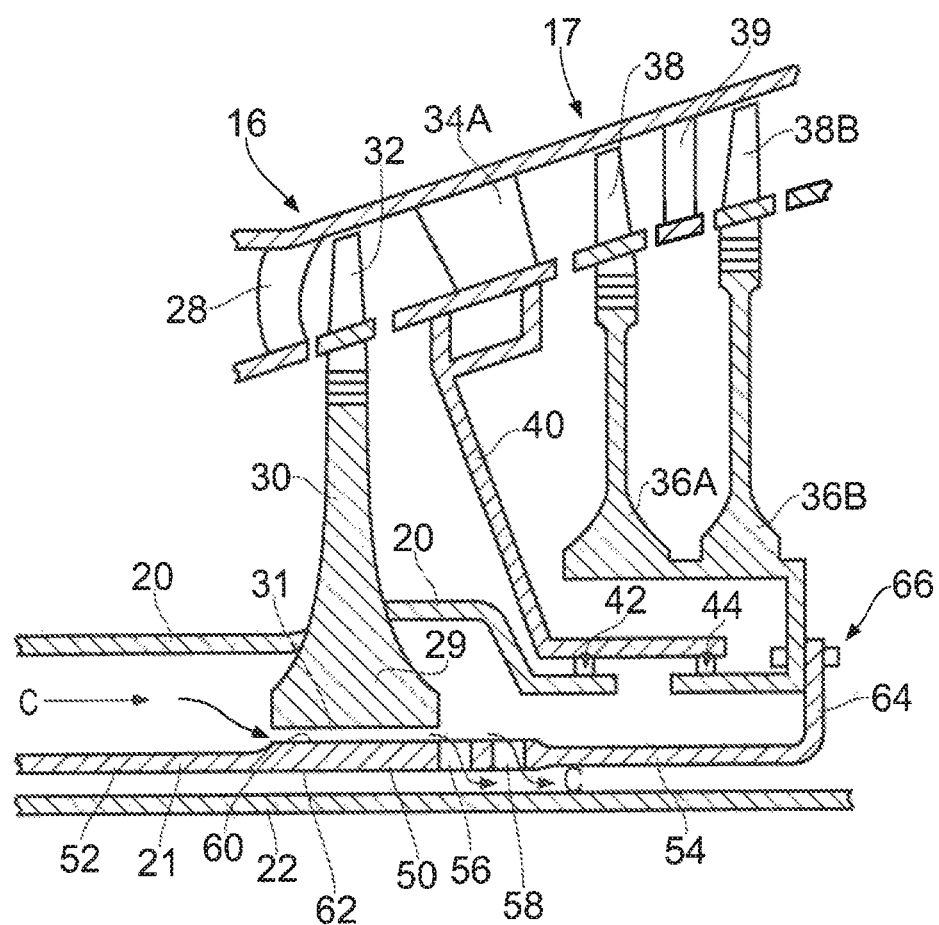
FIG. 8 is a further enlarged alternative cross-sectional view through the turbofan gas turbine engine of FIG. 1 showing the turbine and a shaft according to the present disclosure.

FIG. 8 shows an alternative arrangement of the high pressure turbine 16 and the intermediate pressure turbine 17 in more detail. The arrangement is similar to that shown in FIG. 7, but in this arrangement the first and second sets of apertures 56 and 58 are positioned axially downstream of the high pressure turbine disc 30.

Figure 9:
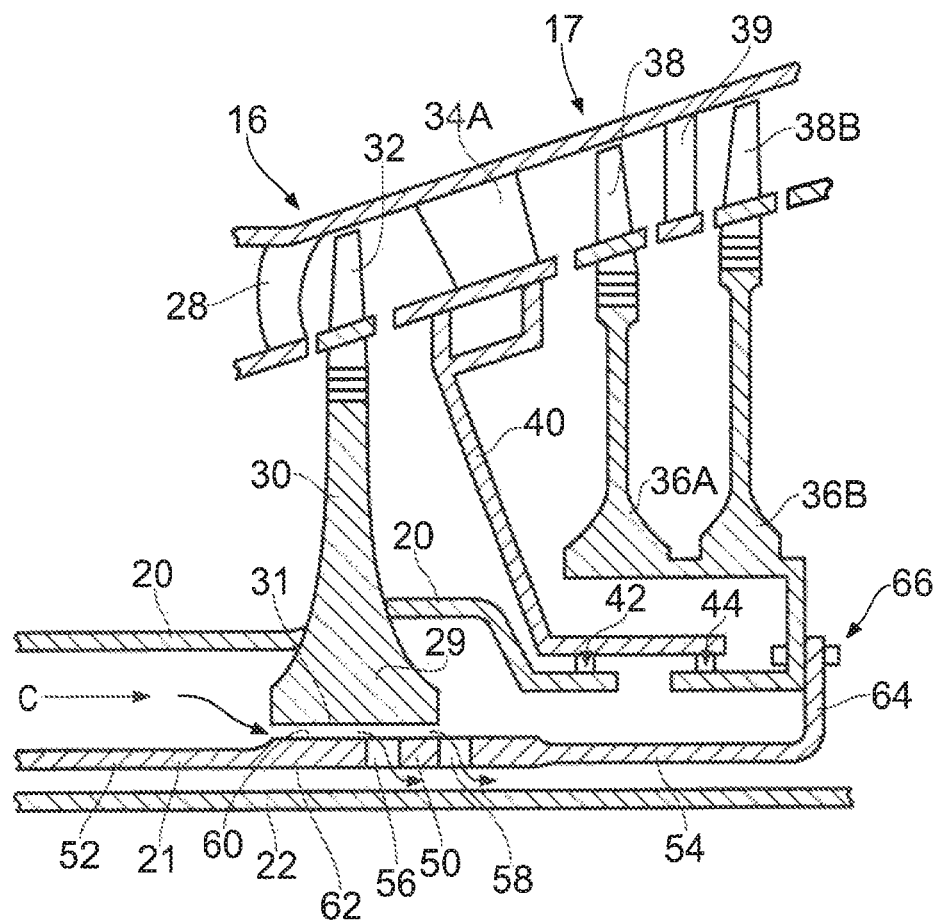
FIG. 9 is another enlarged alternative cross-sectional view through the turbofan gas turbine engine of FIG. 1 showing the turbine and a shaft according to the present disclosure.

FIG. 9 shows an alternative arrangement of the high pressure turbine 16 and the intermediate pressure turbine 17 in more detail. The arrangement is similar to that shown in FIG. 7, but in this arrangement the first set of apertures 56 is positioned axially between the axial ends of the bore 31 and the second set of apertures 58 is positioned axially downstream of the high pressure turbine disc 30.

The advantage of the present disclosure is that in operation when the shaft is subjected to a torsional load the relative positions of the apertures in the first and second sets of apertures uses a compressive stress field generated by one set of apertures to counteract, or reduce, a tensile stress field generated on the other set of apertures. The advantage of this is that the shaft does not have to be made thicker and hence the weight and the cost of the shaft and the gas turbine engine is not increased and/or the shaft does not have to be made from a material, e.g. a metal, with better temperature and stress characteristics and hence the cost of the shaft and the gas turbine engine is not increased.

The relative positions of the apertures in the first and second sets of apertures is determined by the requirement to position the apertures of the first and second sets of apertures as close together as possible to take advantage of the compressive stress field and the requirement to maximise the distance between the apertures in the first and second sets of apertures to have more material between the apertures in the first and second sets of apertures. The relative positions of the apertures in the first and second sets of apertures is a function of the torque and the temperatures and is determined by stress analysis.

Although the present disclosure has referred to two sets of apertures it is equally applicable to three or more sets of apertures in which each aperture in a particular set of apertures is positioned circumferentially between two apertures in the previous set of apertures and each aperture in the particular set of apertures is circumferentially displaced in a second circumferential direction from a circumferential mid position between the two apertures in the previous set of apertures, where the second circumferential direction is opposite to the first circumferential direction, e.g. the rotational direction of the shaft. The relative positions of the apertures in the second and third sets of apertures is determined by the requirement to position the apertures in the second and third sets of apertures as close together as possible to take advantage of the compressive stress field and the requirement to maximise the distance between the apertures in the second and third sets of apertures to have more material between the apertures in the second and third sets of apertures. The relative positions of the apertures in the second and third sets of apertures is a function of the torque and the temperatures and is determined by stress analysis. The relative positions of additional sets of apertures are arranged similarly.

Although the present disclosure has referred to the first and second sets of apertures being arranged in the intermediate pressure shaft, it is equally possible for the first and second sets of apertures to be arranged in the low pressure shaft or the high pressure shaft. It is equally possible for the first and second sets of apertures to be provided in two or more of the low pressure shaft, the intermediate pressure shaft and the high pressure shaft of a three shaft gas turbine engine. It is equally possible for the first and second sets of apertures to be provided in one or more of the low pressure shaft and the high pressure shaft of a two shaft gas turbine engine.

Although the present disclosure has referred to a shaft connecting a compressor to a turbine it is equally applicable to a sub shaft connecting a turbine rotor, e.g. turbine disc, to another turbine rotor, e.g. turbine disc or to a stub shaft connecting a compressor rotor, e.g. a compressor disc, to another compressor rotor, e.g. compressor disc.

Although the present disclosure has been described with reference to a turbofan gas turbine engine it is equally applicable to a turbojet gas turbine engine, a turbo-shaft gas turbine engine or a turbo-propeller gas turbine engine.

Although the present disclosure has referred to an aero gas turbine engine it is equally applicable to a marine gas turbine engine, an automotive gas turbine engine or an industrial gas turbine engine.

Although the present invention has been described with reference to a gas turbine engine it is equally applicable to other turbomachines. The turbomachine may comprise a turbine and a shaft, a compressor and a shaft or a turbine, a compressor and a shaft. The turbomachine may be a steam turbine.

The turbomachine may be a gas turbine engine comprising a turbine, a compressor and a shaft, the upstream end of the shaft being connected to the compressor and the downstream end of the shaft being connected to the turbine.

The gas turbine engine may comprise a low pressure compressor, an intermediate pressure compressor, a high pressure compressor, a high pressure turbine, an intermediate pressure turbine, a low pressure turbine, a high pressure shaft, an intermediate pressure shaft and a low pressure shaft, the high pressure turbine being connected to the high pressure compressor via the high pressure shaft, the intermediate pressure turbine being connected to the intermediate pressure compressor via the intermediate pressure shaft and the low pressure turbine being connected to the low pressure compressor via the low pressure shaft.

The gas turbine engine may comprise a low pressure compressor, an intermediate pressure compressor, a high pressure compressor, a high pressure turbine, a low pressure turbine, a high pressure shaft and a low pressure shaft, the high pressure turbine being connected to the high pressure compressor via the high pressure shaft and the low pressure turbine being arranged to drive the low pressure compressor and the intermediate pressure compressor via the low pressure shaft.

The gas turbine engine may comprise a low pressure compressor, an intermediate pressure compressor, a high pressure compressor, a high pressure turbine, a low pressure turbine, a high pressure shaft, a low pressure shaft and a gearbox, the high pressure turbine being connected to the high pressure compressor via the high pressure shaft, the low pressure turbine being arranged to drive the gearbox via the low pressure shaft, the gearbox being arranged to drive the low pressure compressor and the intermediate pressure compressor.

The low pressure compressor may be a fan or a propeller.

The gas turbine engine may comprise a low pressure compressor, a high pressure compressor, a high pressure turbine, a low pressure turbine, a high pressure shaft and a low pressure shaft, the high pressure turbine being connected to the high pressure compressor via the high pressure shaft and the low pressure turbine being connected to the low pressure compressor via the low pressure shaft.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A shaft having an axis, an outer surface, an inner surface, an upstream end and a downstream end, the shaft being arranged to rotate in a first circumferential direction, the shaft comprising a first set of equally circumferentially spaced apertures extending through the shaft from the outer surface of the shaft to the inner surface of the shaft, the first set of apertures being arranged in a first plane arranged perpendicularly to the axis of the shaft, a second set of equally circumferentially spaced apertures extending through the shaft from the outer surface of the shaft to the inner surface of the shaft, the second set of apertures being arranged in a second plane arranged perpendicularly to the axis of the shaft, the second plane being spaced axially downstream from the first plane, each aperture in the second set of apertures being positioned circumferentially between two apertures in the first set of apertures and each aperture in the second set of apertures being circumferentially displaced in a second circumferential direction from a circumferential mid position between the two apertures in the first set of apertures.

2. A shaft as claimed in claim 1 wherein there are nine apertures in the first set of apertures and nine apertures in the second set of apertures, the apertures in the first set of apertures are circumferentially spaced apart by angles of 40° and the apertures in the second set of apertures are circumferentially spaced apart by angles of 40°.

3. A shaft as claimed in claim 1 wherein each aperture in the second set of apertures is circumferentially spaced from a first one of the two apertures in the first set of apertures by 17° and is circumferentially spaced from a second one of the two apertures in the first set of apertures by 23°.

4. A shaft as claimed in claim 1 wherein the first and second sets of apertures are arranged in a region of the shaft having a greater thickness than axially adjacent portions.

5. A shaft as claimed in claim 1 wherein the apertures of the first set of apertures all have the same diameter.

6. A shaft as claimed in claim 1 wherein the apertures of the second set of apertures all have the same diameter.

7. A shaft as claimed in claim 1 wherein the apertures of the first set of apertures and the apertures of the second set of apertures all have the same diameter.

8. A shaft as claimed in claim 1 wherein the shaft is a turbomachine shaft.

9. A shaft as claimed in claim 8 wherein the shaft is selected from the group consisting of a steam turbine shaft and a gas turbine engine shaft.

10. A turbomachine comprising a turbine, a compressor and a shaft, the shaft having an axis, an outer surface, an inner surface, an upstream end and a downstream end, the upstream end of the shaft being connected to the compressor and the downstream end of the shaft being connected to the turbine, the shaft being arranged to rotate in a first circumferential direction, the shaft comprising a first set of equally circumferentially spaced apertures extending through the shaft from the outer surface of the shaft to the inner surface of the shaft, the first set of apertures being arranged in a first plane arranged perpendicularly to the axis of the shaft, a second set of equally circumferentially spaced apertures extending through the shaft from the outer surface of the shaft to the inner surface of the shaft, the second set of apertures being arranged in a second plane arranged perpendicularly to the axis of the shaft, the second plane being spaced axially downstream from the first plane, each aperture in the second set of apertures being positioned circumferentially between two apertures in the first set of apertures and each aperture in the second set of apertures being circumferentially displaced in a second circumferential direction from a circumferential mid position between the two apertures in the first set of apertures.

11. A turbomachine as claimed in claim 10 wherein the turbomachine is a gas turbine engine, the gas turbine engine comprises a low pressure compressor, an intermediate pressure compressor, a high pressure compressor, a high pressure turbine, an intermediate pressure turbine, a low pressure turbine, a high pressure shaft, an intermediate pressure shaft and a low pressure shaft, the high pressure turbine being connected to the high pressure compressor via the high pressure shaft, the intermediate pressure turbine being connected to the intermediate pressure compressor via the intermediate pressure shaft and the low pressure turbine being connected to the low pressure compressor via the low pressure shaft, the shaft is selected from the group consisting of the high pressure shaft, the intermediate pressure shaft and the low pressure shaft.

12. A turbomachine as claimed in claim 11 wherein the low pressure compressor is selected from the group consisting of a fan and a propeller.

13. A turbomachine as claimed in claim 11 wherein the high pressure turbine comprises a high pressure turbine disc having a bore extending coaxially there-through, the shaft being an intermediate pressure shaft and the intermediate pressure shaft extending axially through the bore in the high pressure turbine disc, the first set of apertures being positioned axially between the axial ends of the bore of the high pressure turbine disc.

14. A turbomachine as claimed in claim 13 wherein the second set of apertures is arranged axially downstream of the high pressure turbine disc.

15. A turbomachine as claimed in claim 10 wherein the turbomachine is a gas turbine engine, the gas turbine engine comprises a low pressure compressor, an intermediate pressure compressor, a high pressure compressor, a high pressure turbine, a low pressure turbine, a high pressure shaft and a low pressure shaft, the high pressure turbine being connected to the high pressure compressor via the high pressure shaft and the low pressure turbine being arranged to drive the low pressure compressor and the intermediate pressure compressor via the low pressure shaft, the shaft is selected from the group consisting of the high pressure shaft and the low pressure shaft.

16. A turbomachine as claimed in claim 15 wherein the high pressure turbine comprises a high pressure turbine disc having a bore extending coaxially there-through, the shaft being a low pressure shaft and the low pressure shaft extending axially through the bore in the high pressure turbine disc, the first set of apertures being positioned axially between the axial ends of the bore of the high pressure turbine disc.

17. A turbomachine as claimed in claim 16 wherein the second set of apertures is arranged axially downstream of the high pressure turbine disc.

18. A turbomachine as claimed in claim 10 wherein the turbomachine is a gas turbine engine, the gas turbine engine comprises a low pressure compressor, an intermediate pressure compressor, a high pressure compressor, a high pressure turbine, a low pressure turbine, a high pressure shaft, a low pressure shaft and a gearbox, the high pressure turbine being connected to the high pressure compressor via the high pressure shaft, the low pressure turbine being arranged to drive the gearbox via the low pressure shaft, the gearbox being arranged to drive the low pressure compressor and the intermediate pressure compressor, the shaft is selected from the group consisting of the high pressure shaft and the low pressure shaft.

19. A turbomachine as claimed in claim 10 wherein the turbomachine is a gas turbine engine, the gas turbine engine comprises a low pressure compressor, a high pressure compressor, a high pressure turbine, a low pressure turbine, a high pressure shaft and a low pressure shaft, the high pressure turbine being connected to the high pressure compressor via the high pressure shaft and the low pressure turbine being connected to the low pressure compressor via the low pressure shaft, the shaft is selected from the group consisting of the high pressure shaft and the low pressure shaft.

20. A turbomachine as claimed in claim 10 wherein the gas turbine engine is selected from the group consisting of an aero gas turbine engine, a marine gas turbine engine, an automotive gas turbine engine and an industrial gas turbine engine.

21. A turbomachine comprising a turbine and a shaft, the shaft having an axis, an outer surface, an inner surface, an upstream end and a downstream end, one of the upstream end and the downstream end of the shaft being connected to the turbine, the shaft being arranged to rotate in a first circumferential direction, the shaft comprising a first set of equally circumferentially spaced apertures extending through the shaft from the outer surface of the shaft to the inner surface of the shaft, the first set of apertures being arranged in a first plane arranged perpendicularly to the axis of the shaft, a second set of equally circumferentially spaced apertures extending through the shaft from the outer surface of the shaft to the inner surface of the shaft, the second set of apertures being arranged in a second plane arranged perpendicularly to the axis of the shaft, the second plane being spaced axially downstream from the first plane, each aperture in the second set of apertures being positioned circumferentially between two apertures in the first set of apertures and each aperture in the second set of apertures being circumferentially displaced in a second circumferential direction from a circumferential mid position between the two apertures in the first set of apertures.

* * * * *